(12) United States Patent
Hirata et al.

(10) Patent No.: US 7,654,137 B2
(45) Date of Patent: *Feb. 2, 2010

(54) CORROSION-RESISTANT METAL MADE SENSOR FOR FLUID AND A FLUID SUPPLY DEVICE FOR WHICH THE SENSOR IS EMPLOYED

(75) Inventors: Kaoru Hirata, Osaka (JP); Nobukazu Ikeda, Osaka (JP); Kouji Nishino, Osaka (JP); Ryousuke Dohi, Osaka (JP)

(73) Assignee: Fujikin Incorporated, Osaka (JP)

( * ) Notice: Subject to any disclaimer, the term of this patent is extended or adjusted under 35 U.S.C. 154(b) by 329 days.

This patent is subject to a terminal disclaimer.

(21) Appl. No.: 10/598,290

(22) PCT Filed: Jan. 13, 2005

(86) PCT No.: PCT/JP2005/000266

§ 371 (c)(1),
(2), (4) Date: Aug. 23, 2006

(87) PCT Pub. No.: WO2005/080925

PCT Pub. Date: Sep. 1, 2005

(65) Prior Publication Data

US 2007/0168150 A1 Jul. 19, 2007

(30) Foreign Application Priority Data

Feb. 24, 2004 (JP) .............................. 2004-047701

(51) Int. Cl.
*G01F 1/68* (2006.01)
(52) U.S. Cl. .................. 73/204.18; 137/487.5
(58) Field of Classification Search .............. 137/487.5; 73/204.11–204.27
See application file for complete search history.

(56) References Cited

U.S. PATENT DOCUMENTS 3,737,684 A * 6/1973 Kuno et al. ................. 327/538

(Continued)

FOREIGN PATENT DOCUMENTS

JP 8-62010 A 3/1996

(Continued)

OTHER PUBLICATIONS

International Search Report, Issued in the Corresponding International Application PCT/JP2005/000266, Completed Feb. 1, 2005 and Mailed Apr. 25, 2005.

*Primary Examiner*—Stephen Hepperle
*Assistant Examiner*—William McCalister
(74) *Attorney, Agent, or Firm*—Griffin & Szipl, P.C.

(57) ABSTRACT

The present invention provides a corrosion-resistant metal made sensor for fluid and a fluid supply device for which the sensor is employed.

More specifically, the corrosion-resistant metal made sensor for fluid is equipped with a corrosion-resistant metal substrate, a mass flow rate sensor part comprising a corrosion resistant metal substrate, a thin film forming a temperature sensor and a heater mounted on the back face side of the fluid contacting surface of the corrosion-resistant metal substrate, and a pressure sensor part comprising a thin film forming a strain sensor element mounted on the back face side of the fluid contacting surface of the corrosion-resistant metal substrate, and the sensor is so constituted that the mass flow rate and pressure of the fluid are measured.

11 Claims, 14 Drawing Sheets

U.S. PATENT DOCUMENTS

| | | | |
|---|---|---|---|
| 4,680,963 A * | 7/1987 | Tabata et al. | 73/204.18 |
| 5,393,351 A * | 2/1995 | Kinard et al. | 136/225 |
| 6,116,092 A * | 9/2000 | Ohmi et al. | 73/715 |
| 6,606,912 B2 * | 8/2003 | Ohmi et al. | 73/756 |
| 6,981,410 B2 * | 1/2006 | Seki et al. | 73/204.26 |
| 7,363,810 B2 * | 4/2008 | Ikeda et al. | 73/204.26 |
| 2002/0100316 A1 * | 8/2002 | James et al. | 73/204.26 |
| 2006/0053878 A1 | 3/2006 | Ikeda et al. | |

FOREIGN PATENT DOCUMENTS

| | | |
|---|---|---|
| JP | 11-345027 A | 12/1999 |
| JP | 2001-141540 A | 5/2001 |
| JP | 2001-141541 A | 5/2001 |
| JP | 3291161 A | 3/2002 |
| JP | 2002-358127 A | 12/2002 |
| JP | 2003-254806 A | 9/2003 |
| JP | 2003-329697 A | 11/2003 |
| WO | 02/055967 A1 | 7/2002 |
| WO | 2004-092688 A1 | 10/2004 |

* cited by examiner (a)

(b)

(c)

Supply Pressure 200 →150kPa abs.

PRIOR ART

CORROSION-RESISTANT METAL MADE SENSOR FOR FLUID AND A FLUID SUPPLY DEVICE FOR WHICH THE SENSOR IS EMPLOYED

This is a National Phase Application in the United States of International Patent Application No. PCT/JP2005/000266 filed Jan. 13, 2005, which claims priority on Japanese Patent Application No. 2004-047701, filed Feb. 24, 2004. The entire disclosures of the above patent applications are hereby incorporated by reference.

FIELD OF THE INVENTION

The present invention is employed mainly for detecting a mass flow rate and/or pressure in a gas supply line, and the like, employed in semiconductor manufacturing facilities, and is concerned with a corrosion-resistant metal made sensor for fluid, and a fluid supply device for which the sensor is employed, in which all of the gas contacting faces are formed of corrosion-resistant metals, such as stainless steel (SUS316L) and the like, having excellent corrosion resistance even to highly corrosive fluids. Thus, the corrosion-resistant metal made sensor can be made particle-free and leak-free, and further enhanced with respect to detecting accuracy.

BACKGROUND OF THE INVENTION

Conventionally, a capillary thermal-type mass flow rate sensor, or a silicon-made ultra-small sized thermal-type mass flow rate sensor, for which micro-machine technologies have been employed, has been widely used to measure a mass flow rate of fluid in various technologies, such as in chemical analysis equipment and the like. The former, or capillary thermal-type mass flow rate sensor, is characterized by the fact that the sensor has its gas contacting faces made of stainless steel due to its structure, which enhances the corrosion resistance of the sensor to fluids that it measures.

Also, the capillary thermal-type mass flow sensor must be equipped with a resistance wire for a heater that is wound to heat a capillary tube, which causes a problem that leads to unevenness in property among products. Another problem is that the response speed of the mass flow rate sensor is slow due to the relatively large heat capacities of the capillary tube and the resistance wire forming the heater.

On the other hand, along with development in recent years of the so-called "micro-machine" technologies, the development and utilization of the latter, or of a silicon-made ultra-small sized thermal-type mass flow rate sensor, have been widely under way. It has become popular, not only in the chemical-related fields, but also in industrial manufacturing fields such as the automobile industry and the like, because a silicon-made ultra-small sized thermal-type mass flow rate sensor can be manufactured by a single processing, thus reducing unevenness in properties among products. Furthermore, extremely fast response speed as a sensor can be achieved by making heat capacities small by downsizing the sensor, all of which are regarded as desired characteristics of a sensor.

However, it is noted that there exist many problems to be solved with silicon-made ultra-small sized thermal-type mass flow rate sensors. Among other things, corrosion resistance is one problem that is urgently needed to be solved. That is, a silicon-made ultra-small sized mass flow rate sensor employs silicon as a constituent component to form gas contacting faces. Therefore, a fundamental difficulty encountered with conventional sensors is that these silicone gas contacting faces can be easily corroded by fluids of the halogen family and the like.

Furthermore, organic materials such as epoxy resin, an O-ring and the like, are used as sealing materials for the mass flow rate sensor, thus making the emission of particles, or the occurrence of an outside leak, unavoidable. Consequently, such sensors cannot be employed for the gas supply line, and the like, in semiconductor manufacturing facilities.

Furthermore, another problem exits with the mass flow rate sensor, namely, fluctuation in detecting values of the mass flow rate sensor occurs when the pressure of the fluid to be measured changes, or there may be distortion of the sensor itself caused by a mechanical tightening force (or thrust) that occurs when the mass flow rate sensor is fitted to the gas supply line. These problems cause unevenness in detecting values of the mass flow rate sensor.

So far, various techniques have been developed to solve these difficulties with the afore-mentioned silicon-made ultra-small sized thermal-type mass flow rate sensor. For example, with the devices of TOKU-KAI No. 2001-141540 and the TOKU-KAI No. 2001-141541 and the like, there is provided a temperature resistance layer $E_6$ on the outermost layer of a film E, formed on the upper face of the frame D made from a silicon substrate A, as shown in FIG. 20, to enhance stability of the film E. As shown in FIG. 20, $E_1$ to $E_3$ designate a silicon oxide layer forming a film E, $E_4$ designates a silicon nitride layer, $E_5$ designates a platinum layer, and C designates lead connecting hardware.

As stated above, with the afore-mentioned silicon-made ultra-small sized thermal-type mass flow rate sensor, as shown in FIG. 20, there is formed a silicon nitride layer $E_4$ on the lower face side of the frame D, or a temperature resistant layer $E_6$ consisting of a silicon nitride layer, to enhance water resistance and moisture resistance of the film E.

Patent Document 1: TOKU-KAI No. 2001-141540 Public Bulletin

Patent Document 2: TOKU-KAI No. 2001-141541 Public Bulletin

OBJECTS OF THE INVENTION

The present invention solves the afore-mentioned problems with conventional mass flow rate sensors, such as (1) that unevenness in property among products is caused and the response speed is low when a capillary thermal type mass flow rate sensor is used, and (2) that the emission of particles, the occurrence of outside leaks, and the like, cannot be avoided when a silicon-made ultra-small sized thermal-type mass flow rate sensor is used because such sensors are less corrosion-resistant, and also because unevenness in detecting values of the mass flow rate occurs due to changes in pressure of the fluid to be measured or changes in the fitting mechanism of the sensor. It is a primary object of the present invention to provide a corrosion-resistant metal made sensor for fluid and a fluid supply device for which the sensor is employed, and (a) to make it possible that ultra-small sized products with uniform quality can be manufactured by using micro-machine technologies; (b) further, to make it possible that unevenness caused by changes in detecting values of the fluid pressure is automatically adjusted; (c) to make a sensor of the invention equipped with excellent corrosion resistance; (d) to make it possible that a sensor, in accordance with the invention, achieves high response speed and to make the sensor particle-free; (e) to make the sensor outside-leakless; and (f) to make it possible that both mass flow rate and fluid pressure are detected by the sensor.

Means to Solve the Objects

Inventors of the present invention have realized that by employing micro-machine technologies to form 2 resistance thermometer sensors, a heater, a lead wire to connect elements, and the like, required for a mass flow rate sensor part and a strain sensor element, a lead wire and the like, required for a pressure sensor part by using a thin film body on a substrate made of corrosion-resistant metal, such as stainless steel and the like, can be made so that (a) unevenness in quality of the sensor for fluid is prevented and corrosion resistance and responsivity are enhanced, (b) a particle-free and outside leakless sensor is achieved, (c) unevenness caused by changes in detecting values of fluid pressure is automatically adjusted, and (d) fluid pressure can be monitored through the pressure sensor part. A prototype of a sensor for fluid, equipped with the mass flow rate sensor part and the pressure sensor part, in accordance with the present invention, has been built and operation tests have been performed thereon.

The present invention has been created based on the aforementioned idea and the results of various tests. The present invention, in accordance with a first embodiment, is characterized by a corrosion-resistant metal made sensor constructed so that the mass flow rate and pressure of fluid are measured by its being equipped with a mass flow rate sensor part 3 comprising a corrosion-resistant substrate 2, and a thin film forming a temperature sensor 3a, and a heater 3b installed on the back face side of the fluid contacting surface of the corrosion-resistant substrate 2, and a pressure sensor part 4 comprising a thin film forming a strain sensor element 4a mounted on the back face side of the fluid contacting surface of the metal substrate 2.

The present invention, in accordance with a second embodiment, modifies the first embodiment so that a corrosion-resistant metal substrate 2 is fitted into the mounting groove 10a of a corrosion-resistant metal made sensor base 10 in a state in which its fluid contacting surface is exposed outwardly, and the peripheral edge of the corrosion-resistant metal substrate 2 is hermetically welded to the sensor base 10.

The present invention, in accordance with a third embodiment, modifies the first and second embodiments so that the output drift to the pressure of the mass flow rate sensor part 3 is corrected by the output of the pressure sensor part 4.

The present invention, in accordance with a fourth embodiment, is made so that a thin film F in accordance with the first, second or third embodiments, is provided with an insulating film 5 formed on the back side of the fluid contacting surface of the corrosion-resistant metal substrate 2, a metal film M that forms a temperature sensor 3a, a heater 3b and a strain sensor element 4a thereupon, and a protection film 6 to cover the insulating film 5 and the metal film M.

The present invention, in accordance with a fifth embodiment, is made so that a corrosion-resistant metal made sensor for fluid, in accordance with one of the first four embodiments, is mounted on a fluid controller in order that the flow rate and pressure can be appropriately checked at the time of fluid control.

The present invention, in accordance with a sixth embodiment, is constructed so that a sensor base 10 of the corrosion-resistant metal made sensor S for fluid, in accordance with the second embodiment, is positioned inside the fluid passage 21b of a body 21 equipped with the afore-mentioned fluid passage 21b for communicating between the flow-in inlet 21a for the fluid G and the flow-out outlet 21c for the fluid by installing a metal gasket 27, in order that hermeticity between the body 21 and the sensor base 10 is held by thrusting the metal gasket 27 through the mediation of the afore-mentioned sensor base 10, and at the same time stiffness of the structural component directly above the metal gasket 27 is relatively raised to hold the afore-mentioned hermeticity, thus suppressing strain of the mass flow rate sensor part 3 and the pressure sensor part 4 caused by thrusting the metal gasket 27.

EFFECTS OF THE INVENTION

In accordance with the present invention, a mass flow rate sensor is manufactured by applying micro-machine technologies, as in the case of a conventional silicon made ultra-small sized mass flow rate sensor, thus reducing unevenness in quality among products to a minimum. In addition, a corrosion-resistant metal substrate, for example, the substrate made with SUS316L used for the sensor substrate, is processed to make the substrate a thin plate, and a resistance wire and the like are made to be thin films so as to make the heat capacity of the sensor part extremely small, thus increasing the response speed of the sensor remarkably.

Also, in accordance with the present invention, all the gas contacting faces are constituted of a corrosion-resistant metal, and the sensor part and the sensor base are assembled by welding, and a metal gasket sealing is employed to mount the gas contacting faces and sensor part and sensor base on a valve body and the like, thus making the sensor corrosion-free, particle free and outside leak-free.

In addition, in accordance with the present invention, a mass flow rate sensor and a pressure sensor part are concurrently formed on the corrosion-resistant metal substrate, thus making it possible to adjust the amount of changes (the drift amount) of the mass flow rate due to changes of the fluid pressure, by using detecting values in the pressure sensor part, to allow accurate detection of the mass flow rate and also to output detected values of the pressure to the outside, when necessary.

shows the relationship between temperature of a heater and the resistance value of the temperature detecting resistance, (b) shows the relationship between current of the heater and the resistance value of the temperature detecting resistance, and (c) shows the relationship between gas flow rate and sensor output.

Figure 9:
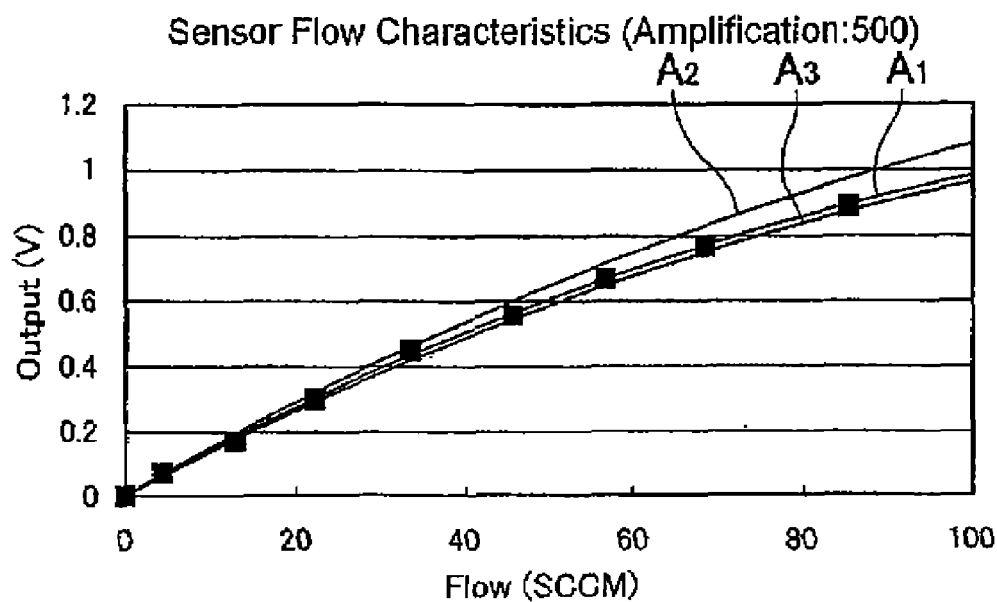

FIG. 9 is a graph illustrating flow rate characteristics of a sensor when compensation is performed against pressure changes by using a pressure sensor part 4.

Figure 10:
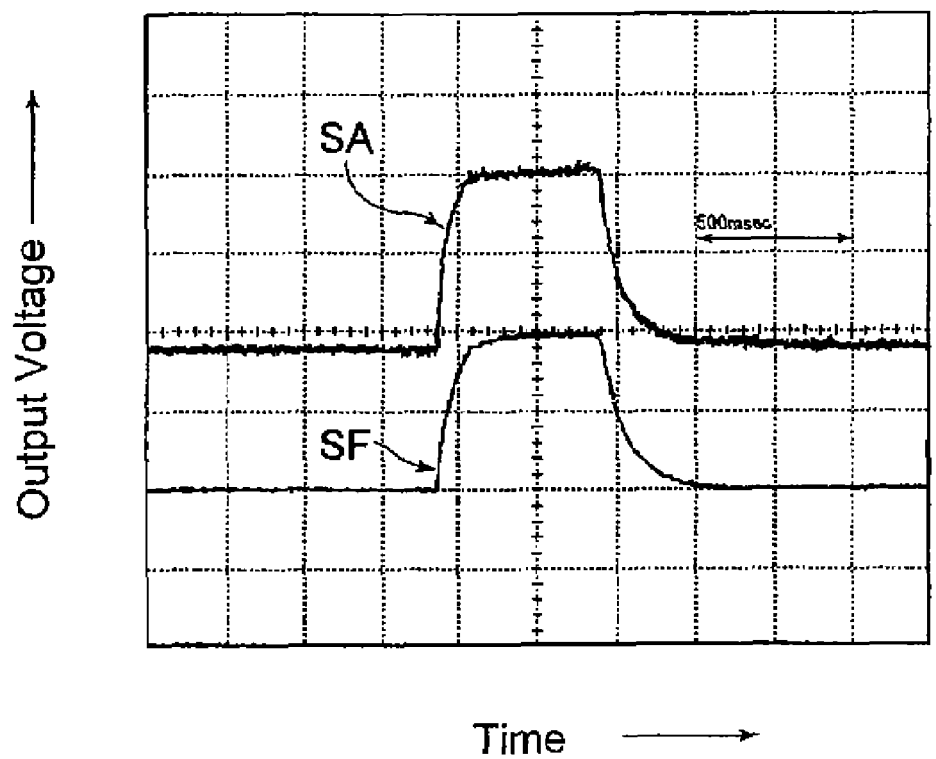

FIG. 10 is a diagram illustrating one example of flow rate response characteristics of a sensor for fluid, in accordance with the present invention.

Figure 11:
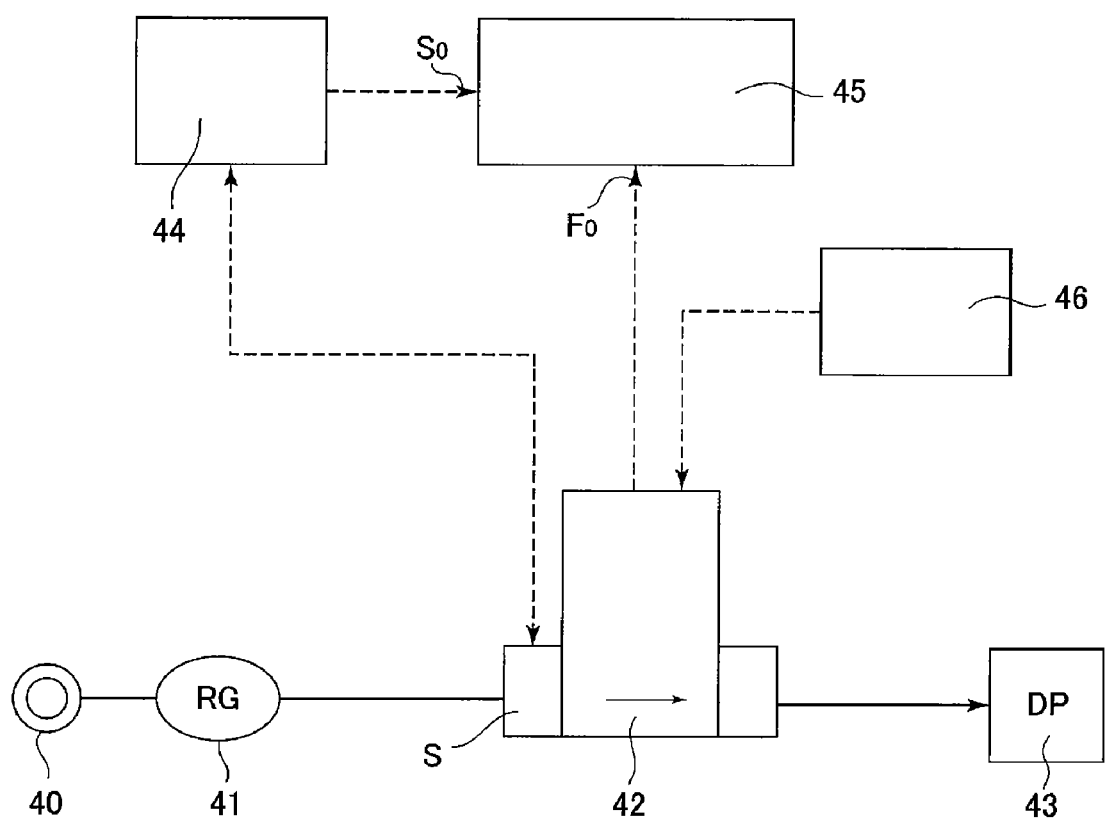

FIG. 11 is a flow block diagram of a measuring circuit used for measuring flow rate characteristics of a sensor S for fluid, in accordance with the present invention.

Figure 12:
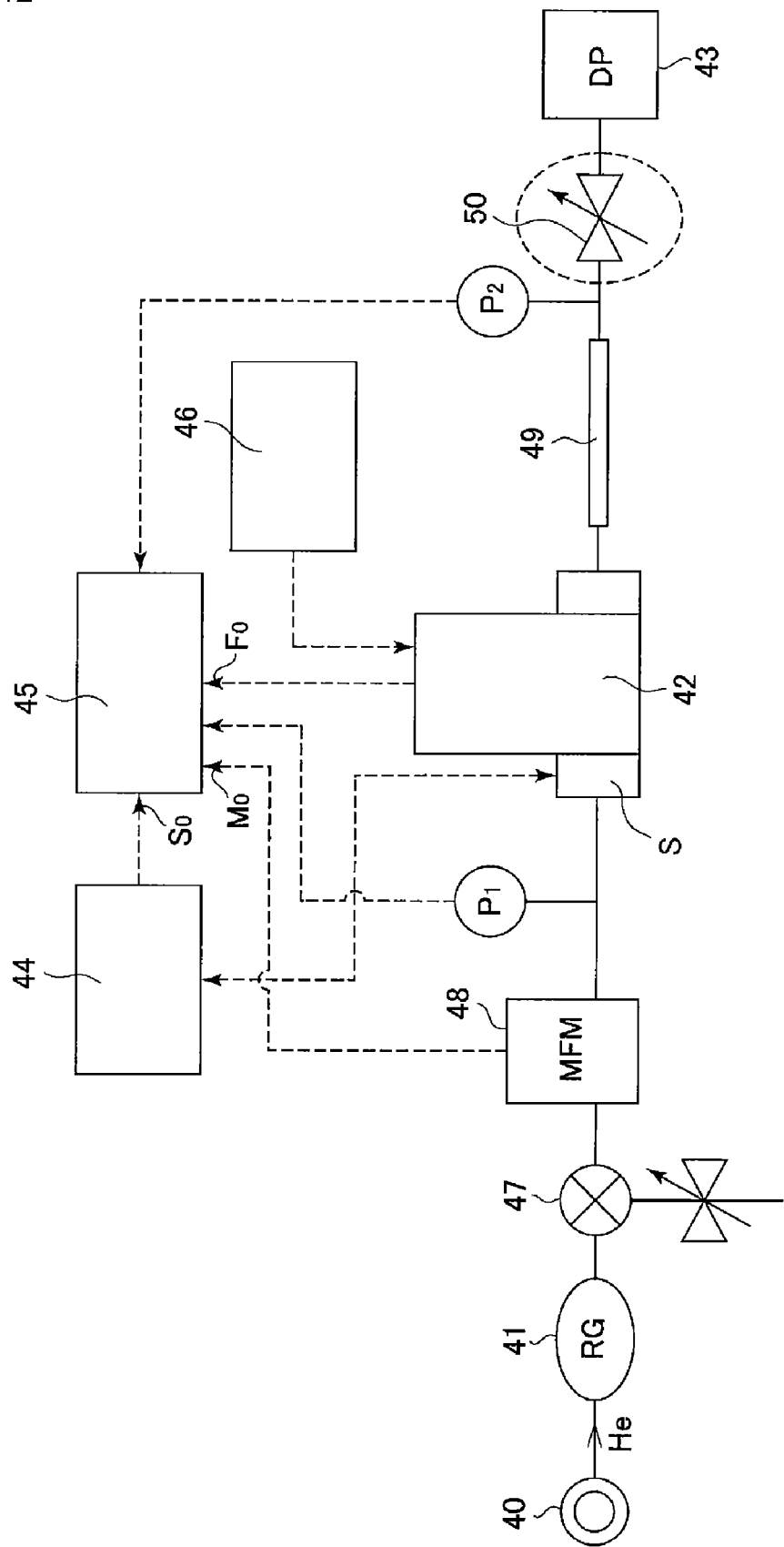

FIG. 12 is a flow block diagram of a measuring circuit used for measuring flow rate characteristics to supply pressure changes of a sensor S for fluid, in accordance with the present invention.

Figure 13:
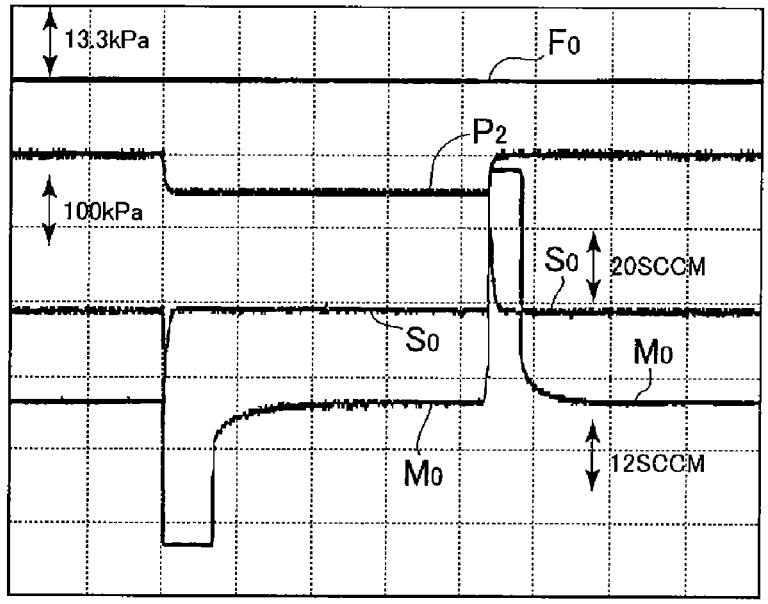

FIG. 13 is a diagram illustrating flow rate characteristics, at the time of supply pressure changes, of a sensor S for fluid in accordance with the present invention as measured using the measuring circuit of FIG. 12.

Figure 14:
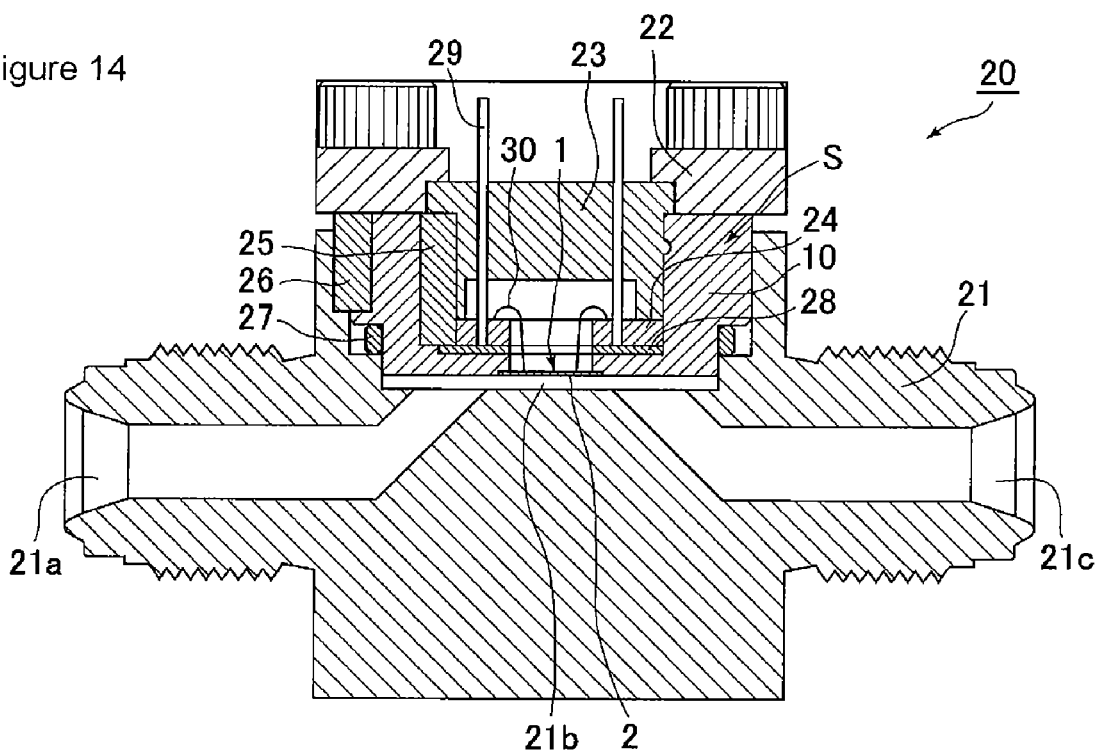

FIG. 14 is a cross-sectional view illustrating an example of an assembly drawing of a sensor for fluid, according to the present invention.

Figure 15:
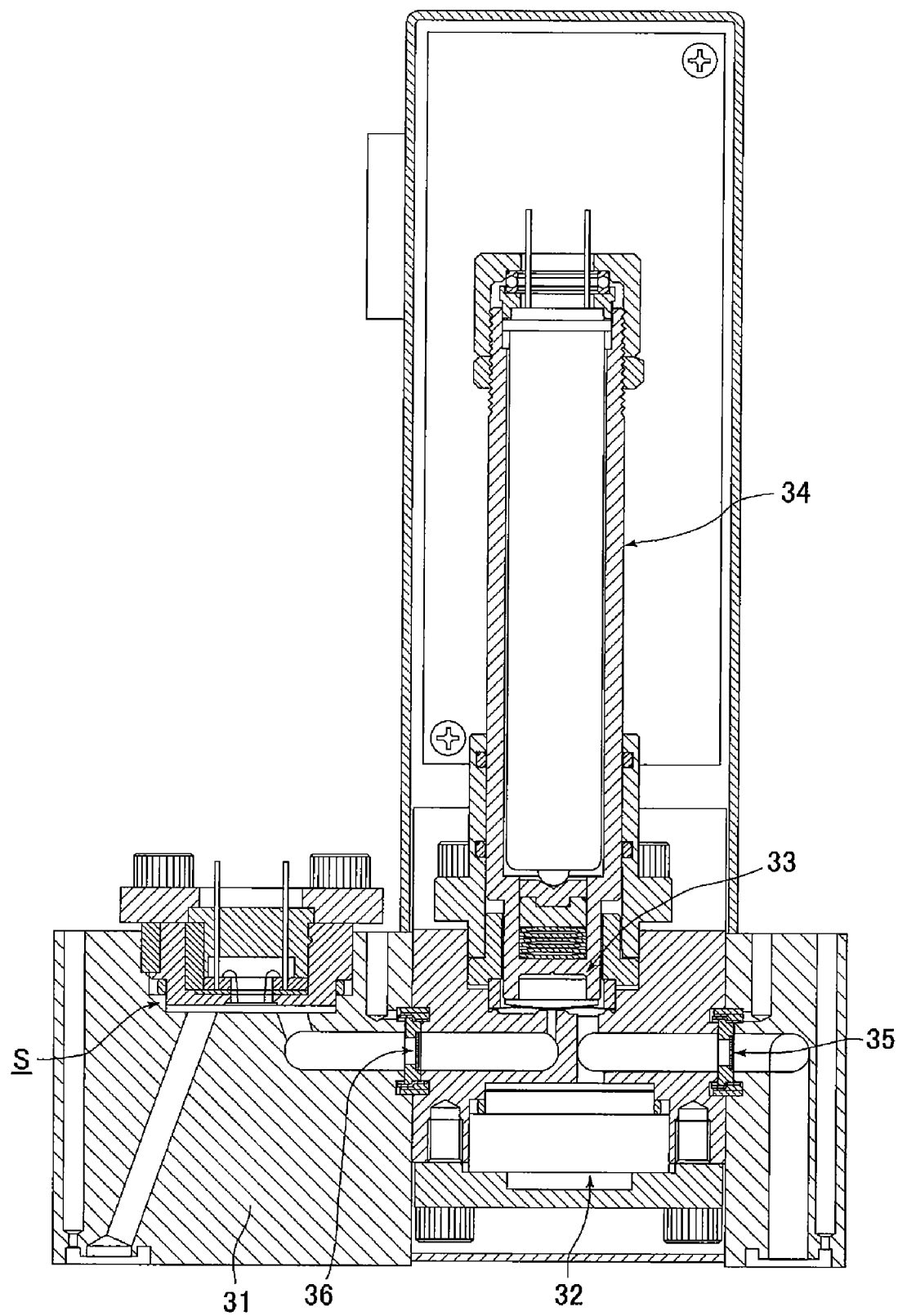

FIG. 15 is a cross-sectional view illustrating another example of an assembly drawing of a sensor for fluid, according to the present invention.

Figure 16:
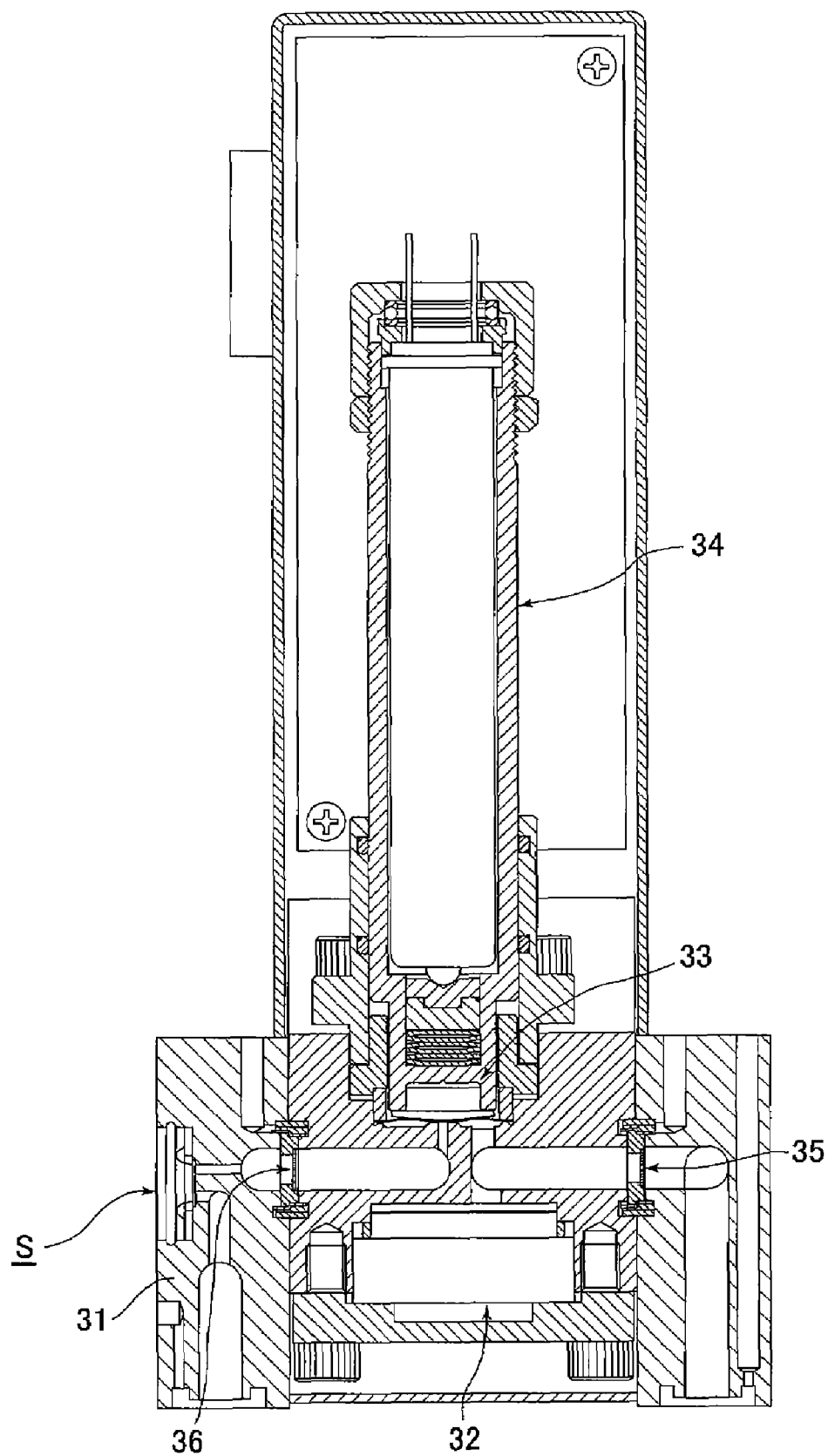

FIG. 16 is a cross-sectional view illustrating the assembly drawing of yet another example of a sensor for fluid according to the present invention.

Figure 17:
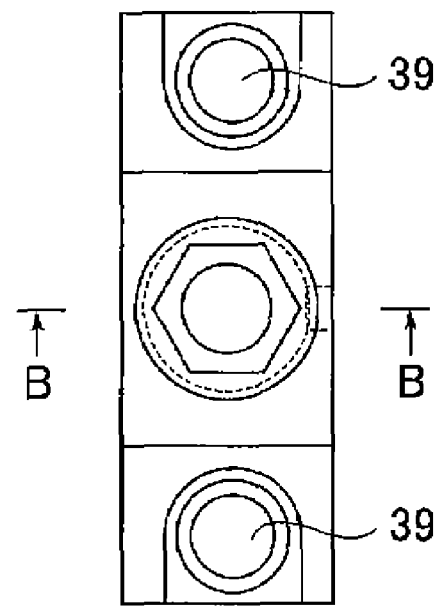

FIG. 17 is a plan view illustrating another example of an assembly of a sensor for fluid, according to the present invention.

Figure 18:
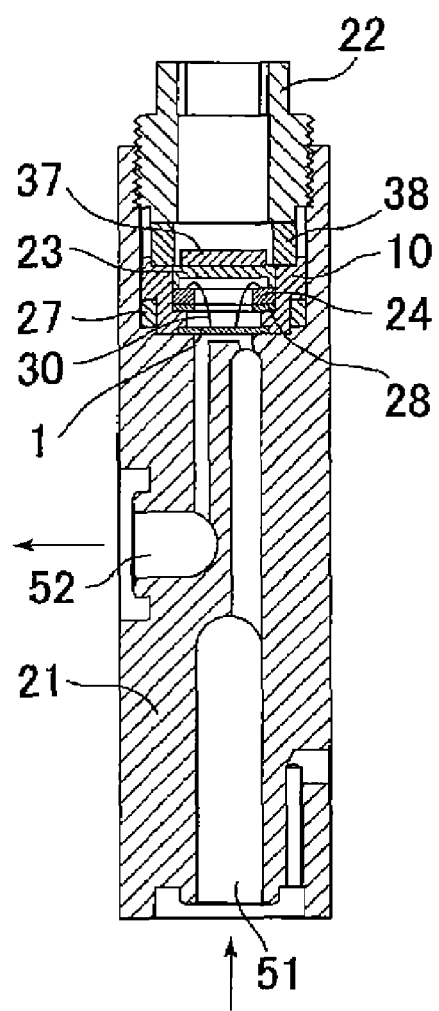

FIG. 18 is a cross-sectional view taken along line B-B of FIG. 17.

Figure 19:
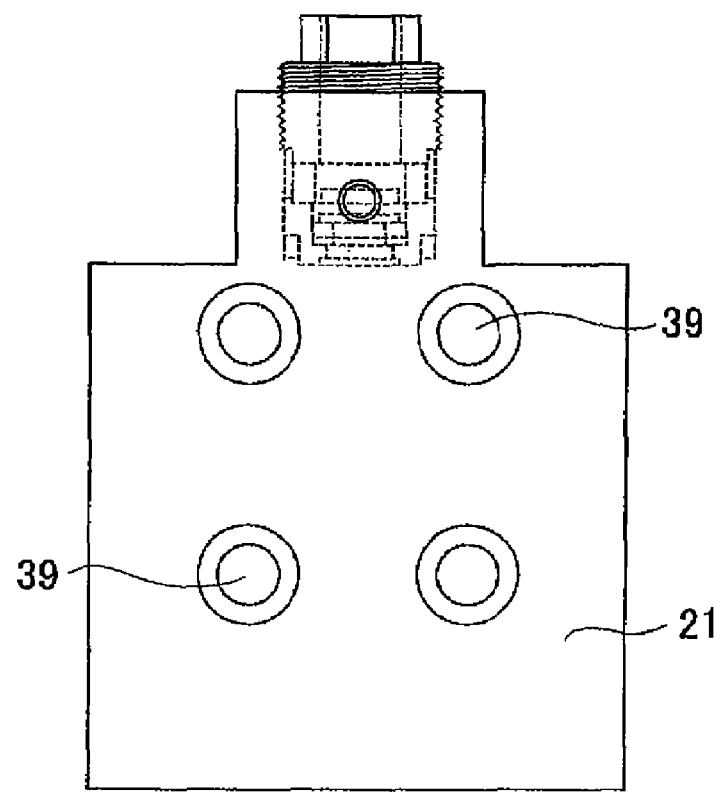

FIG. 19 is a side view of the assembly of FIG. 17.

Figure 20:
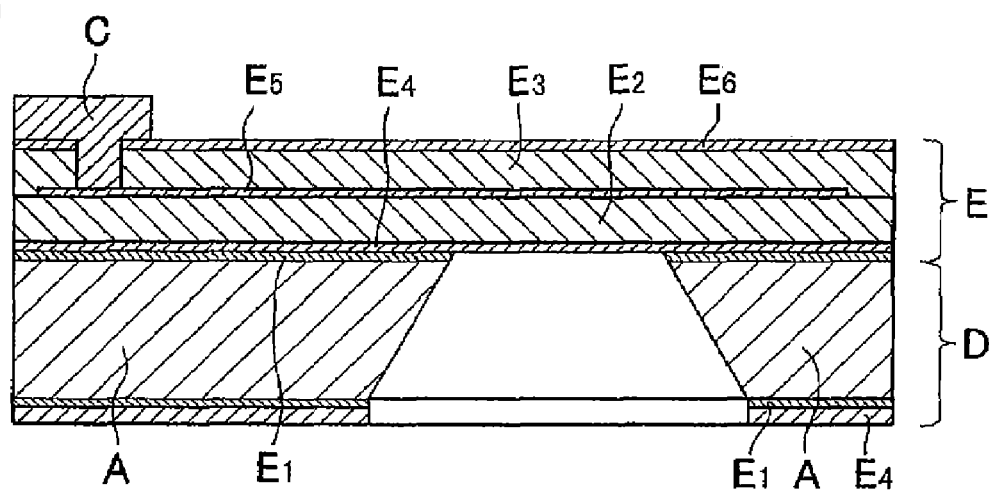

FIG. 20 is a cross-sectional view illustrating the outline of a conventional silicon made ultra-small sized thermal-type mass flow rate sensor.

LIST OF REFERENCE CHARACTERS AND NUMERALS

S Corrosion-resistant metal made sensor for fluid
F Thin film
$M_1$ Metal film that forms a mass flow rate sensor part
$M_2$ Metal film that forms a pressure sensor part
W Corrosion-resistant metal material
G Gas to be measured
1 Sensor part
2 Corrosion-resistant metal substrate
3 Mass flow rate sensor part
3a Temperature sensor
$3a_1$, $3a_2$ Temperature detecting resistances
3b Heater
4 Pressure sensor part
4a Strain sensor element
5 Insulation film
6 Protection film
6a Protection film for the mass flow rate sensor part
6b Protection film for the strain sensor part
7 Electrode insertion hole
9a・9b Resists
10 Sensor base
10a Mounting groove
11 Heater driving circuit
12a Pressure offset adjustment circuit
12b Mass flow rate offset adjustment circuit
13 Offset adjustment circuit (for fine tuning)
14 Gain adjustment circuit
15a, 15b Differential amplifying circuits
16 Mass flow rate output terminal
17 Fluid pressure output terminal
$4a_1$・$4a_2$ Strain sensor elements
18 Signal treatment circuit
19 Multiplying treatment circuit
20 Joint part
21 Body
22 Sensor base presser
23 Wiring substrate presser
24 Wiring substrate
25・26 Guide pins
27 Metal gasket
28 Rubber sheet
29 Lead pin
30 Lead wire (a gold wire)
31 Body
32 Pressure detector
33 Control Valve
34 Piezo-electric valve driving device
35 Orifice
36 Filter
37 Relay substrate
38 Bearing
39 Fixture screw hole
40 He gas source
41 Pressure adjuster
42 Pressure type flow rate controller
43 Diaphragm vacuum pump
44 Driving circuit for the sensor S for fluid
45 Oscilloscope
46 Signal transmitter
47 3-way switching valve
48 Mass flow meter
$P_1$・$P_2$ Pressure gages
49 Secondary side pipe passage of the pressure type flow rate controller (inner capacity of 15 cc or 50 cc)
50 Pressure adjusting valve
$S_O$ Flow rate output of the sensor S for fluid
$F_O$ Flow rate output of the pressure type flow rate controller
$M_O$ Flow rate output of the mass flow meter
PT Output of the secondary side pressure gauge
51 Fluid flow-in inlet
52 Fluid flow-out outlet

BEST MODE OF CARRYING OUT THE INVENTION

Detailed Description of the Invention

Preferred Embodiment 1 of the Corrosion-Resistant Metal Made Sensor for Fluid

Figure 1:
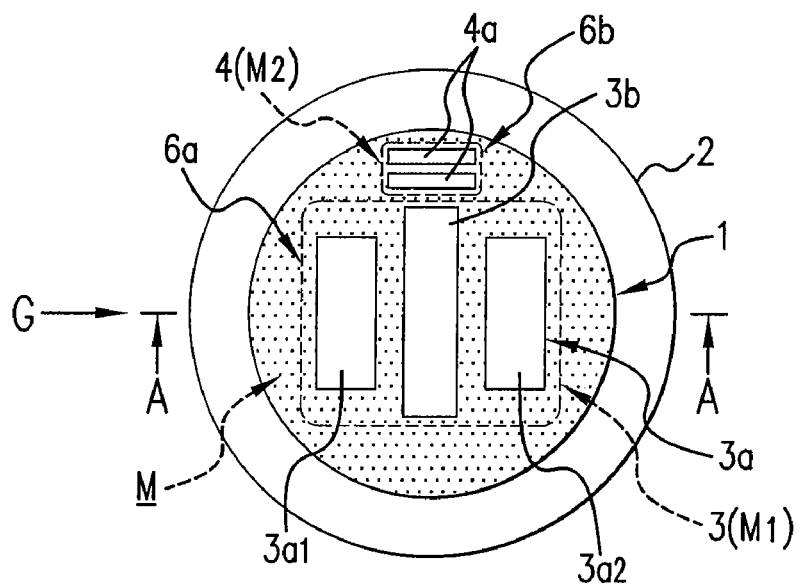
FIG. 1 is a plan schematic view of a sensor part of a corrosion-resistant metal made thermal-type mass flow rate sensor according to the present invention.
Figure 2:
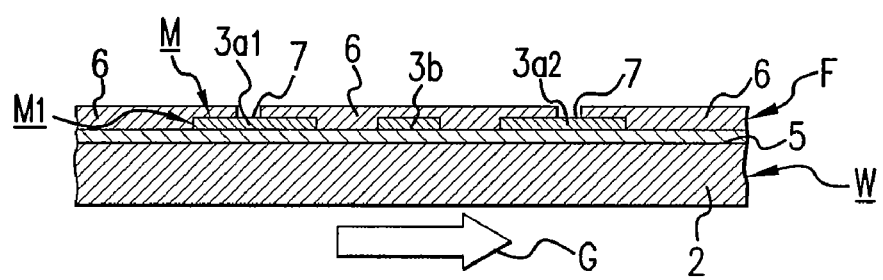
FIG. 2 is a cross-sectional schematic view taken along line A-A of FIG. 1.

An embodiment in accordance with the present invention is described as follows with reference to the drawings. FIG. 1 is a plan schematic view of sensor part 1, which is an essential part of a corrosion-resistant metal made thermal-type mass flow rate sensor according to the present invention. FIG. 2 is a cross-sectional schematic view taken on line A-A of FIG. 1.

Sensor part 1 comprises a thin corrosion-resistant metal substrate 2, an insulation film 5 formed on the upper face of the substrate 2, a mass flow rate sensor part 3 and a pressure sensor part 4 formed on the upper face of the insulation film 5, and a protection film 6, and the like, formed on the mass flow rate sensor part 3, the pressure sensor part 4, and the like. Also, the afore-mentioned mass flow rate sensor part 3 comprises a temperature sensor 3a, a heater 3b and the like, and the afore-mentioned pressure sensor part 4 comprises a strain sensor element 4a, and the like, respectively. Furthermore, as shown in FIG. 2, a thin film F is formed with a metal film M that forms an insulation film 5, and with temperature detecting resistances $3a_1$, $3a_2$ of the temperature sensor 3a, a heater 3b, an electric conductive lead part (not illustrated), a strain sensor element 4a and the like, and a protection film 6 on the upper face side (or on the back face side of the fluid contacting surface) of the corrosion-resistant metal substrate 2. And, an electrode insertion hole 7, with an approximate size, is formed on the afore-mentioned protection film 6 by an etching process.

Figure 3:
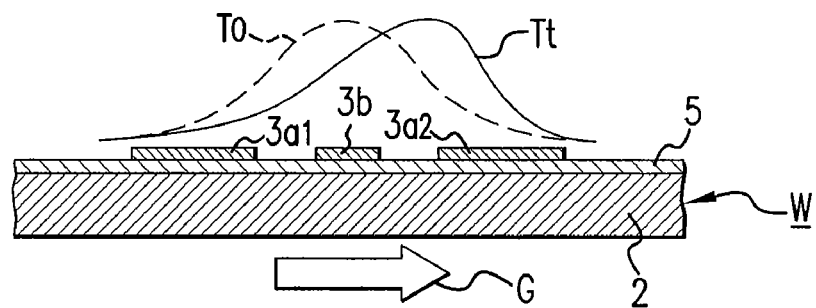
FIG. 3 is an explanatory drawing of the operating principle of a corrosion-resistant metal made thermal-type mass flow rate sensor, according to the present invention.

A gas G to be measured flows in the direction of the arrow, shown in FIG. 2, along the corrosion-resistant metal substrate 2 on the under face side (or the surface side of the fluid contacting surface) of the sensor part 1 as shown in FIG. 2 and FIG. 3. When this happens, some of the heat of the gas G is given to the corrosion-resistant metal substrate 2, thus resulting in shifting of the temperature distribution Tt of the corrosion-resistant metal substrate 2 from the temperature distribution To, where there is no flow of gas G, to the temperature distribution Tt as shown in FIG. 3.

As stated above, changes in the temperature distribution of a corrosion-resistant metal substrate 2 caused by the flow of gas G are presented as changes in voltage values at both ends of the temperature detecting resistances $3a_1$, $3a_2$ through mediation of changes in the resistance values of the temperature detecting resistances $3a_1$, $3a_2$, which form the temperature sensor 3. Thus, the mass flow rate of gas G can be known by detecting changes in the voltage values as a differential output. The above stated operating principle of the thermal type mass flow rate sensor is identical to that of publicly known silicon made thermal-type mass flow rate sensors. Therefore, a detailed explanation is omitted herewith.

Similarly, the pressure of the gas G, to be measured, is continuously detected through mediation of output of the strain sensor element 4a, and the pressure changes of gas G are detected as output changes of the strain sensor element 4a. As described later, because output of the mass flow rate sensor part 3 changes roughly in proportion to pressure of the gas G to be measured, a detection value of the detected mass flow rate at the mass flow rate sensor part 3 is corrected by using a detected pressure value at the pressure sensor part 4.

The response speed and sensor sensitivity of the mass flow rate sensor part 3 are affected by the corrosion-resistant metal material W, which forms the afore-mentioned sensor part 1, because the thermal capacity of the sensor part 1 changes with its thickness. Referring to FIG. 1 and FIG. 2, in accordance with the present embodiment, a stainless steel thin plate (SUS316L) of less than 150 µm thick is used. It is possible to raise the response speed and sensor sensitivity by making the thickness less than 150 µm, thus the heat capacity of the sensor part 1 is also smaller. However, it goes without saying that the thickness could be more than 150 µm if sufficient response speed and sensor sensitivity are assured.

As described later, the afore-mentioned insulation film 5 is an oxidized film having a thickness of 1.2 µm to 1.8 µm, formed by the so-called "CVD method" (Chemical Vapor Deposition method). In accordance with this embodiment, a 1.5 µm thick $SiO_2$ film, formed by the CVD (Chemical Vapor Deposition) method, has been used for the insulation film 5.

The afore-mentioned temperature detecting resistances $3a_1$, $3a_2$ and heater 3b are made from a metal film $M_1$ formed by using a mask pattern (not illustrated) for the mass flow rate sensor on the afore-mentioned insulation film 5. In accordance with the present embodiment, the temperature detecting resistances $3a_1$, $3a_2$, and heater 3b, and the like, are made from a metal film formed by a Cr/Pt/Cr film (with thickness of 10/100/10 µm, respectively) that is laminated, in order, by the vapor deposition method.

Similarly, a strain sensor element 4a is made from a metal film $M_2$ formed by using a mask pattern (not illustrated) for the strain sensor part on the afore-mentioned insulation film 5. In accordance with the present embodiment, the strain sensor element 4a, and the like, are made from a metal film $M_2$ formed by Cr/Cr—Ni/Cr film (with thickness of 10/100/10 µm, respectively) that is laminated, in order by, the vapor deposition method.

The afore-mentioned protection film 6 is a film body to cover the upper part of the temperature detecting resistances $3a_1$, $3a_2$, the heater 3b, the strain sensor element 4a, and the like. In accordance with the present embodiment, the 0.4 to 0.7 µm thick $SiO_2$ film (the mass flow rate sensor part 3 and the pressure sensor part 4), formed by the CVD method, is used. Also, the protection film 6 is provided with a suitably shaped electrode insertion hole 7, made by a plasma etching method, to draw out an electrode rod, and the like, through the electrode insertion hole 7.

Figure 5:
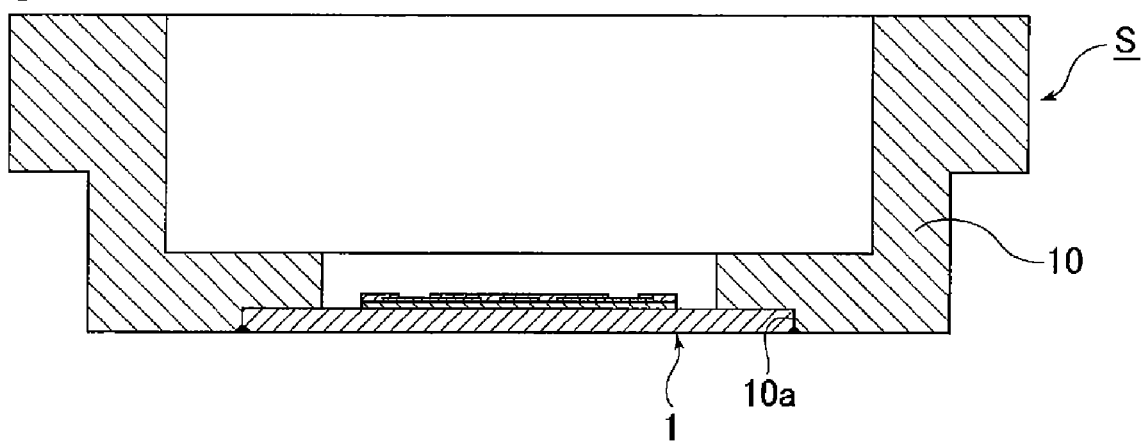
FIG. 5 is a sectional schematic view illustrating an example of a corrosion-resistant metal made fluid sensor.

The back face side of the corrosion-resistant metal substrate 2, which forms sensor part 1, is finished with a thickness of less than 150 µm. The sensor part 1 is eventually separated from the corrosion-resistant metal material W by a method of the so-called "through-etching processing." As described later, the separately formed sensor part 1 is hermetically fixed to the corrosion-resistant metal made flow rate sensor base 10 by laser welding, or the like, so that the corrosion-resistant metal made sensor S for fluid, according to the present invention, having the structure as shown in FIG. 5 is so constituted. In FIG. 5, 10a is a mounting groove provided on the sensor base 10.

[Work Process of the Sensor Part]

Figure 4:
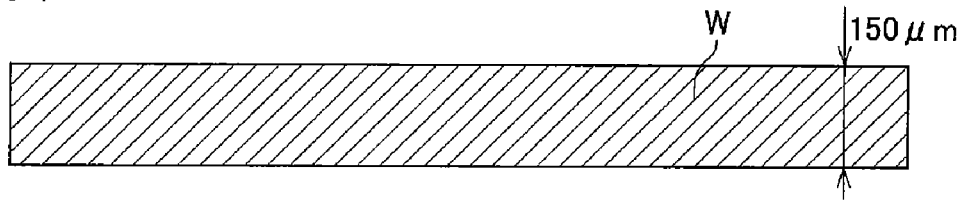
FIG. 4 includes explanatory drawings illustrating the manufacturing process of a sensor part, where (a) pertains to the preparation process of a stainless steel thin plate, (b) pertains to the formation process of an insulation film 5, (c) pertains to the formation process of a Cr/Pt/Cr film (a metal film M), (d) pertains to the formation process of a protection film 6, (e) pertains to the formation process of an electrode insertion hole, (f) pertains to the etching process of the back side of the stainless steel thin plate, and (g) pertains to the separation etching process of sensor part 1.
Figure 4:
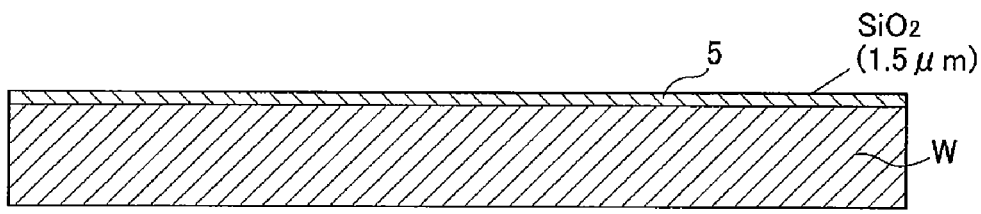
Figure 4:
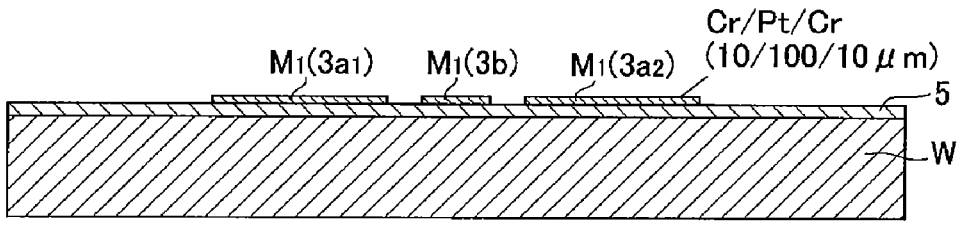
Figure 4:
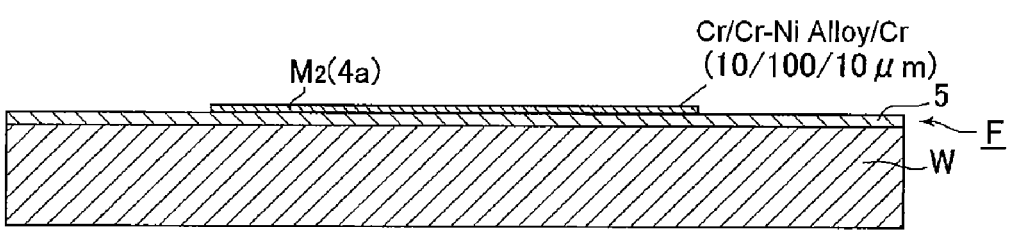
Figure 4:
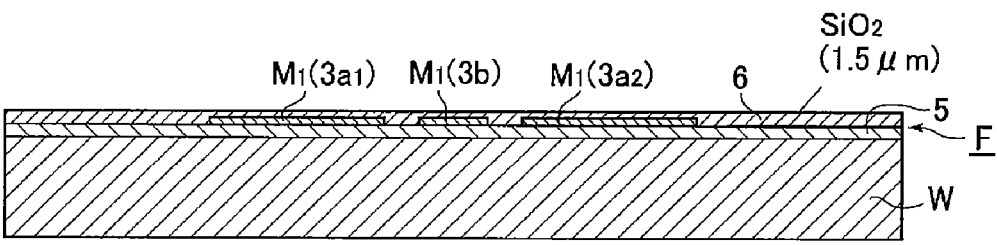
Figure 4:
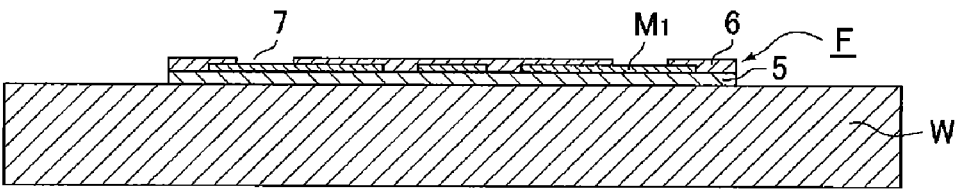
Figure 4:
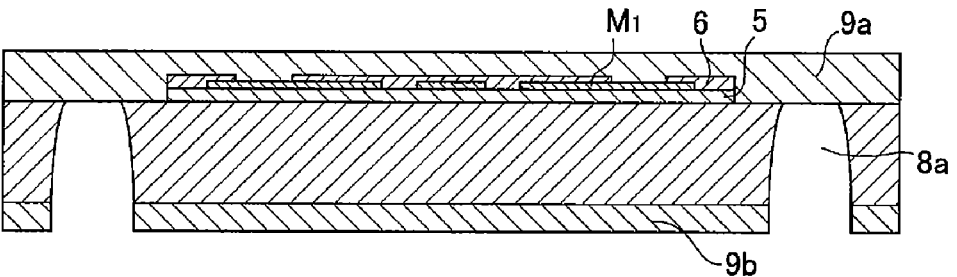

Next, a manufacturing work process of the mass flow rate sensor part 3, which forms the afore-mentioned sensor part 1, is explained as follows. FIG. 4 provides explanatory drawings showing the manufacturing process of the mass flow rate sensor part 3, and pressure sensor part 4, which form the sensor part 1 in accordance with the present invention.

First, as shown in FIG. 4(a), a stainless steel made thin plate (SUS316L) with appropriate dimensions, for example, of the diameter of 70 to 150 mmφ and a thickness of less than 150 µm, is prepared for the corrosion-resistant metal material. It goes without saying that a thin metal plate (for example, an austenitic steel plate made of a Cr—Ni alloy) other than a thin stainless steel plate can be employed as the corrosion-resistant metal material W.

Then, as shown in FIG. 4(b), a $SiO_2$ film 5 (an insulation film) with a thickness of approximately 1.5 µm is formed on the outer back face of the afore-mentioned prepared stainless steel thin plate by a plasma CVD device (Plasma-Enhanced Chemical Vapor Deposition Device) for which TEOS (Tetra-Ethoxy-Silane) is used.

After that, as shown in FIG. 4(c), there are formed patterns of temperature detecting resistances $3a_1$, $3a_2$, a heater 3b, and the like, made from a metal film $M_1$ formed by a Cr/Pt/Cr film (with thickness of 10/100/10 µm, respectively) by employing an electronic beam heating-type vapor deposition device and photo-mask patterns (not illustrated) for forming a mass flow rate sensor part 3 on the afore-mentioned $SiO_2$ film 5.

After the metal film $M_1$, which forms the afore-mentioned mass flow rate sensor part 3, has been formed, then patterns of a strain sensor element 4a, and the like, made from a Cr/Cr—Ni alloy/Cr film (with thickness of 10/100/10 μm, respectively) are made on the $SiO_2$ film 5, as shown by FIG. 4(d), with a metal film $M_2$ by using photo-mask patterns (not illustrated) for forming the pressure sensor part 4 instead of the photo-mask patterns for forming the mass flow rate sensor part 3.

And then, a $SiO_2$ film (a protection film) 6, of thickness of approximately 0.5 μm, is formed on the temperature detecting resistances $3a_1$, $3a_2$ and heater 3b, which form the mass flow rate sensor part 3, and on the strain sensor element 4a, which forms the pressure sensor part 4. The protection film 6 is made through the processes of the afore-mentioned FIG. 4(c) and FIG. 4(d), which utilize the plasma CVD device for which the afore-mentioned TEOS is employed in accordance with FIG. 4(e).

Then, on the afore-mentioned protection film 6 are made an electrode takeout hole (an electrode insertion hole 7) with a bore of 200 μm that is used for the temperature detecting resistances $3a_1$, $3a_2$ and heater 3b, and also an electrode takeout hole (not illustrated), with a bore of approximately 100 μm, that is used for the strain sensor element 4a. The electrode takeout holes are made by using photo-mask patterns (not illustrated) to make an electrode insertion hole, in accordance with FIG. 4(f), employing the plasma etching device that uses $CF_4$ gas.

Because SUS316L or Cr has a high tolerance to the plasma of $CF_4$ gas, etching progress stops automatically upon completion of etching of the $SiO_2$ film 6. Accordingly, there is no danger at all that so-called "over-etching" may occur.

Lastly, after resists 9a, 9b have been coated, sensor part 1 is detached from the material W by cutting through, in a circular shape, with the etching treatment using ferric chloride solution ($FeCl_3 \cdot 40$ wt %).

The circular shaped sensor part 1, once separated from the material W, is fitted into the mounting groove 10a of the sensor base 10, formed in the shape as shown in FIG. 5, and is welded and fixed hermetically to the sensor base 10 at the outer periphery part that is laser-welded. Thus, a corrosion-resistant metal made sensor S for fluid according to the present invention is constructed.

Figure 6:
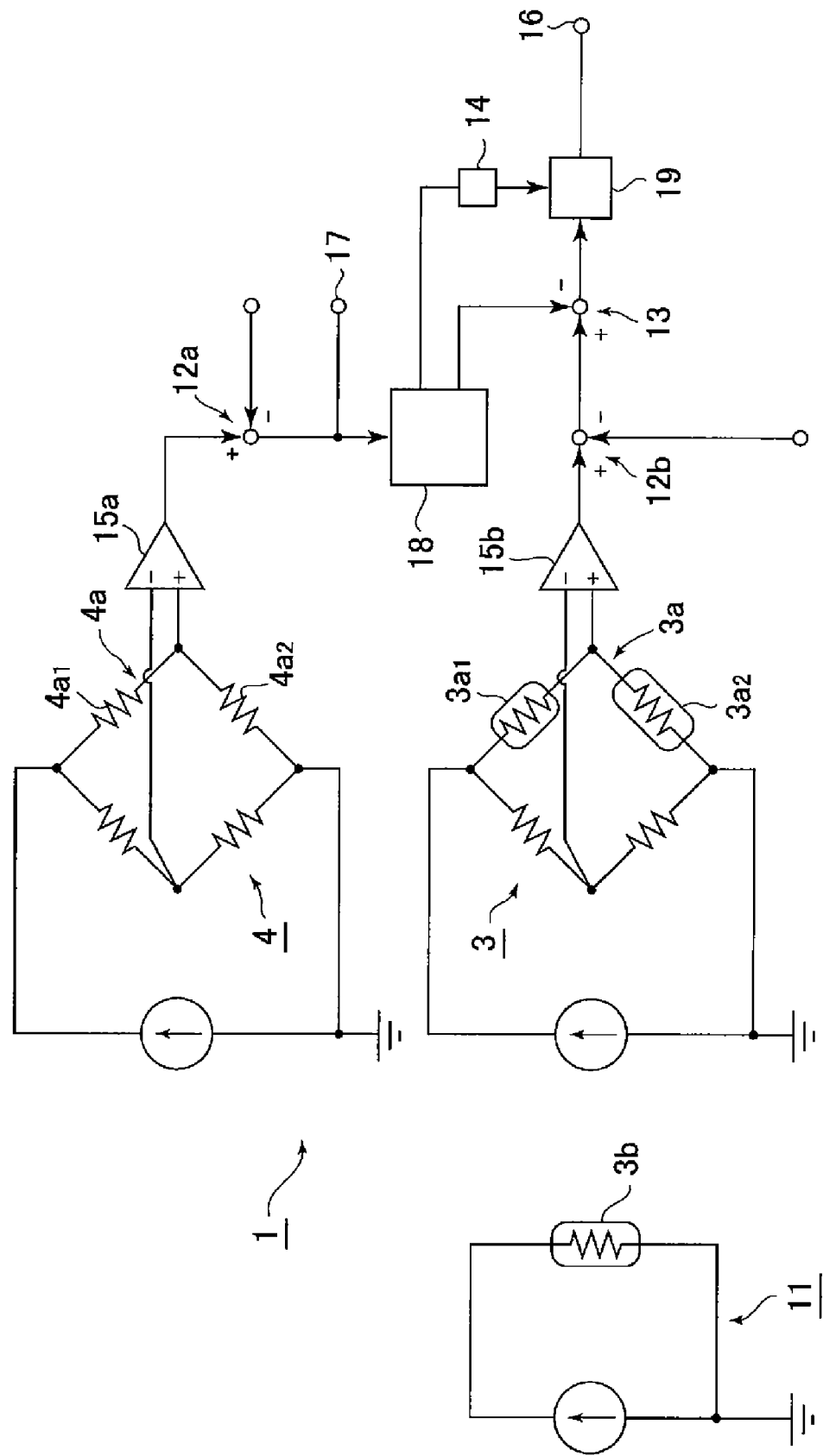
FIG. 6 is a block diagram of a signal detecting circuit, for detecting the mass flow rate of a sensor for fluid, according to the present invention.

FIG. 6 is a block diagram of a signal detecting circuit for detecting a mass flow rate of the fluid sensor S, according to the present invention. The signal detecting circuit comprises a sensor part 1 formed by a mass flow rate sensor part 3 and a pressure sensor part 4, a heater driving circuit 11, a pressure offset adjustment circuit 12a, a mass flow rate offset adjustment circuit 12b, an offset adjustment circuit (for fine tuning) 13, a gain adjustment circuit 14, differential amplifying circuits 15a, 15b, a mass flow rate output terminal 16, a fluid pressure output terminal 17, a signal treatment circuit 18, a multiplying treatment circuit 19, and the like. As shown in FIG. 6, $3a_1$ and $3a_2$ are temperature sensor elements, and $4a_1$ and $4a_2$ are strain sensor elements.

Referring to FIG. 6, the mass flow rate sensor part 3 is heated by the operation of the heater driving circuit 11. When resistance values change with temperature changes of the upstream side temperature detecting resistance $3a_1$ and the downstream side temperature detecting resistance $3a_2$, which form the temperature sensor element 3a of the mass flow rate sensor part 3, while the gas G to be measured passes through, these changes are inputted to the differential amplifying circuit 15b as changes of voltage, and the differential amplifying output is outputted to the mass flow rate output terminal 16 through mediation of the mass flow rate offset adjustment circuit 12b, the offset adjustment circuit 13, and the multiplying treatment circuit 19.

Because the corrosion-resistant metal substrate 2, which forms a sensor part 1 of the present invention, is made to be a thin film, the sensor part 1 strains with the gas pressure when gas G passes through, thus resulting in changes of resistance values of the temperature detecting resistances $3a_1$, $3a_2$ of the temperature sensor 3a, so as to make the bridge output of the temperature sensor 3a change.

Figure 7:
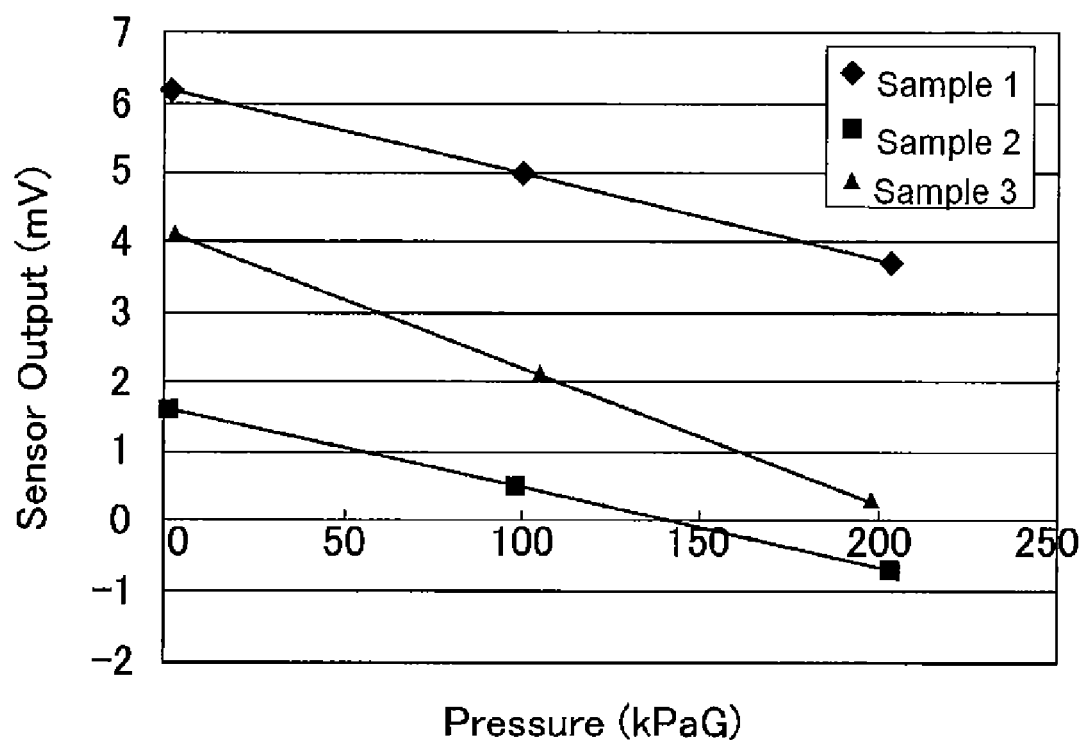
FIG. 7 is a graph illustrating the relationship between fluid pressure and the fluid sensor output/bridge circuit output of the temperature sensor.

FIG. 7 shows the relationship between fluid pressure when no adjustment is made with the pressure sensor part 4 (namely, the gain adjustment with pressure offset adjustment circuit 12a, the adjustment with offset adjustment circuit 13 by output from the signal treatment circuit 18, and the gain adjustment with gain adjustment circuit 14), and the mass flow rate output (the output mV of output terminal 16) with the fluid sensor S according to the present invention. Curves A, B and C show the measured values (in the case of a current value of 5 mA to the temperature detecting resistances $3a_1$, $3a_2$) with three samples.

In either case of when the heater 3b is operated or the heater 3b is not operated, experimentation has confirmed that output of the sensor S changes with change of fluid pressure. Or even with the same heater operating current, experimentation has confirmed that the amount of change in the resistance values, due to fluid pressure P of the upstream side temperature detecting resistance $3a_1$ and the downstream side temperature detecting resistance $3a_2$, differ.

As stated above, when an ordinary resistance bridge circuit is employed, a problem occurs in that output of the sensor part 1 changes with the generation of strain. However, using the signal detecting circuit according to the present invention, the sensor S is constituted so that the rate of amplification of voltage values, outputted from the upstream side temperature detecting resistance $3a_1$ and the downstream side temperature detecting resistance $3a_2$ and the offset, are fine-tuned through the mediation of strain sensor elements $4a_1$, $4a_2$, the pressure offset adjustment circuit 12a, the signal treatment circuit 18, and the like, with the output from the pressure sensor part 4. Thus, changes in the output voltage values of the temperature detecting resistances $3a_1$, $3a_2$, produced by the application of the fluid pressure P, is cancelled out by adjusting the afore-mentioned amplification rate and the offset. As a result, it becomes possible that output changes of the sensor part 1, by the gas pressure, are perfectly constrained, thus making it possible to accurately detect mass flow rate.

Figure 8:
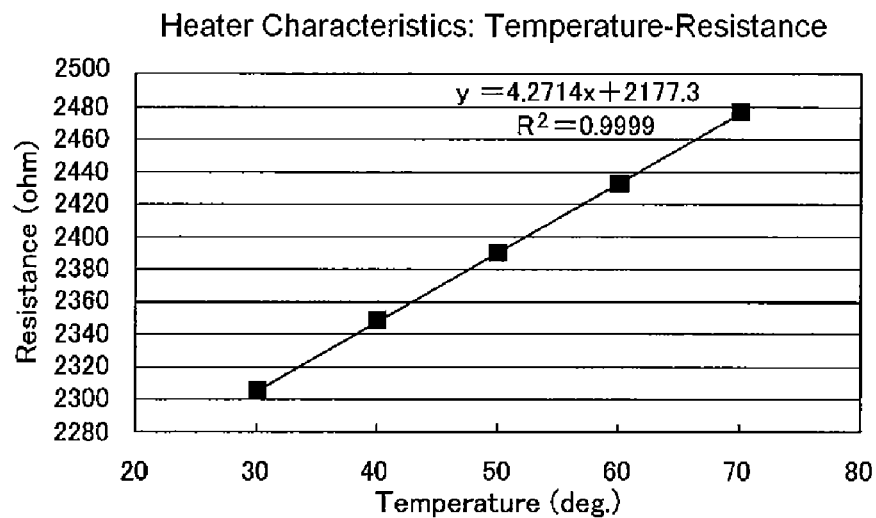
FIG. 8 includes graphs illustrating various characteristics of a sensor part, according to the present invention, where (a)
Figure 8:
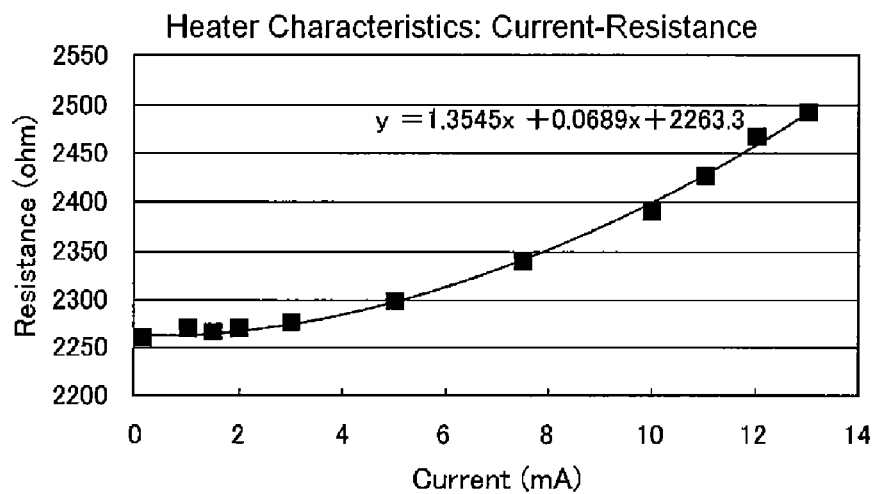
Figure 8:
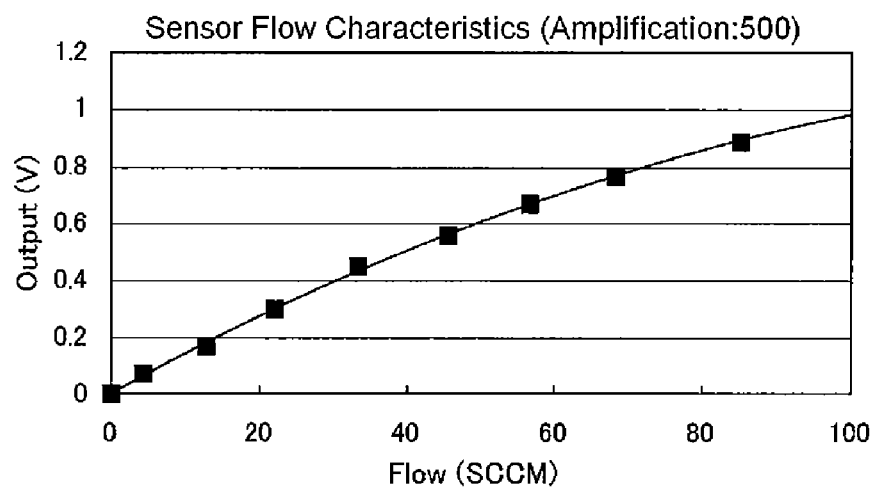

FIG. 8 illustrates characteristics of a sensor S for fluid according to the present invention. FIG. 8(a) shows the relationship between the temperature of heater 3b and the resistance value, FIG. 8(b) shows the relationship between the current value of heater 3b and the resistance value, and FIG. 8(c) shows the relationship between the gas flow rate (SCCM) and the detected output value (V), respectively.

The resistance value of the heater 3b of the temperature sensor 3a, used to measure various characteristics in FIG. 8, is approximately 2.4 kΩ, and the resistance values of the temperature detecting resistances $3a_1$, $3a_2$ are each 2.0 kΩ (both having identical values). 10 mA current was passed to the heater 3b, and 1.2 mA current was passed to the temperature detecting resistances $3a_1$, $3a_2$. Also, the fluid pressure was kept at a specific value of 100 kPaG.

Furthermore, changes in the output value of the sensor part 1 were approximately 1.0V when the gas flow rate was made to change in the range of 0 to 100 SCCM. (However, the output value was amplified 500 times with the OP amplifier.)

In addition, because the output value of the sensor part 1 depends on the clearance (the height of the flow passage) between the flow rate sensor base 10 of the fluid sensor S and the fluid passage shown in FIG. 14, as described later, the range capable for measuring flow rate can be appropriately switched by adjusting the afore-mentioned height of the flow passage.

FIG. 9 illustrates the relationship between fluid flow rate and sensor output at a time when the pressure sensor part 4 is operated and adjustment is performed by the pressure sensor part 4 as shown in FIG. 6. As shown in FIG. 9, Curve $A_1$ shows the case when the pressure sensor part 4 is not operated with a fluid pressure of 100 KPaG (namely, Curve C as shown in FIG. 8). Curve $A_2$ shows the case when the fluid pressure is raised to 150 KPaG (namely, the pressure sensor part 4 not being operated, and other conditions for experiments are same as those of Curve $A_1$). Curve $A_3$ shows the case when the pressure sensor part 4 is operated with fluid pressure of 150 KPaG (other conditions for experiments are same as those of Curve $A_1$). In accordance with the sensor S for fluid, according to the present invention, testing confirmes that even when fluid pressure changes from 100 KPaG to 150 KPaG, changes in the flow rate-output characteristics are completely prevented by operating the pressure sensor part 4.

FIG. 10 shows one example of flow rate response characteristics of the sensor S for fluid, and also shows characteristics in the case when the gas flow rate is set at 0 to 100 SCCM. As shown by FIG. 10, Curve SA demonstrates the flow rate response characteristics of the sensor S for fluid according to the present invention, and the lateral axis is graduated in 250 msec blocks. Curve SF illustrates flow rate response characteristics under the same conditions as those of the mass flow rate sensor with a conventional pressure type flow rate controller. FIG. 11 is a flow block diagram of the measuring circuit used for measuring the relationship, shown in FIG. 9, between gas flow rate (SCCM) and detected output value (V) of the afore-mentioned fluid sensor S according to the present invention. Helium (He) gas is supplied from the He gas source 40 to the pressure type flow rate controller 42 through the pressure adjuster 41, and the exhausted flow rate is measured with pressure type flow rate controller 42 while He is exhausted by the diaphragm vacuum pump 43.

The sensor S for fluid, according to the present invention, which is a sensor to be tested, is fitted to the primary side flow passage of the pressure type flow rate controller 42. As shown in FIG. 11, 44 designates a driving circuit for the sensor S for fluid (a flow rate sensor), 45 designates an oscilloscope, and 46 designates a signal transmitter. The flow rate output $S_0$ of the sensor S for fluid is inputted to the oscilloscope 45, and is contrasted with the flow rate measurement value $F_0$ from the pressure type flow rate controller 42.

FIG. 12 is a flow block diagram of the measuring circuit used when supply pressure of the afore-mentioned sensor S for fluid, according to the present invention, changes. As shown in FIG. 12, 47 designates a 3-way switching valve, 48 designates a mass flow meter, 49 designates the secondary side pipe passage (with the inner capacity of 15 cc or 50 cc), 50 designates a pressure adjusting valve (the degree of opening so adjusted that $P_2$ becomes 100 Torr at the He flow rate of 20 SCCM), and $P_1$, $P_2$ designate pressure gages.

When the measurement is conducted, the pressure of the He gas supplied to the mass flow meter 48, and to the sensor S for fluid (a product of the present invention•a sensor to be measured) and to the pressure type flow rate controller 42 is made to change by opening/closing the 3-way switching valve 47. The secondary pipe passage 49, of the pressure type flow rate controller 42, is set so that its inner capacity is 15 cc (or 50 cc). And, the secondary side Pressure $P_2$ is adjusted by the pressure adjusting valve 50 so that the pressure $P_2$ is 100 Torr when the He gas flow rate is 20 SCCM during the full load operation of the vacuum pump 43. The detected flow rate $S_0$ of the sensor S, the detected flow rate $M_0$ of the mass flow meter 48, the detected flow rate $F_0$ of the pressure type flow rate controller 42, and the pressure measurement values $P_1$, $P_2$, respectively, are inputted to and recorded by the oscilloscope.

FIG. 13 shows measurement results obtained with the afore-mentioned measurement circuit shown in FIG. 12. The state of changes in the detected values $F_0$, $P_2$, $S_0$, $M_0$ is shown at the time when the supply pressure is made to change from 200 KPa·abs to 150 KPa·abs. It is revealed, from FIG. 13, that when the detected value $S_0$ of the flow rate of the sensor S for fluid, according to the present invention, is compared with the detected value $M_0$ of the flow rate of the mass flow meter 48, both detected values $S_0$ and $M_0$ of the flow rate (flow rate signals) keep up with the changes in supply pressure Embodiment 1 of the Fluid Supplier FIG. 14 shows one example of a fluid supplier equipped with a sensor S for fluid, according to the present invention. It also shows a state of the sensor S for fluid that is fitted to the joint part 20 mounted on the gas flow passage. As shown in FIG. 14, 21 designates a body of the joint part 20, 22 designates a sensor base presser, 23 designates a wiring substrate presser, 24 designates a wiring substrate, 25 designates a guide pin, 26 designates a guide pin, 27 designates a metal gasket, 28 designates a rubber sheet, 29 designates a lead pin, and 30 designates a lead wire (a gold wire). The afore-mentioned guide pins 25, 26 are used for positioning the mass flow rate sensor S when it is fitted to the inside of the body 21. Hermeticity between the sensor base 10 and the body 21 is maintained by the metal gasket 27.

While the fluid gas G flows in from the fluid flow-in inlet 21a and passes through a fluid passage 21b, the mass flow rate of gas G is detected by the sensor part 1, and the fluid gas G flows outside via the fluid flow-out outlet 21c. In accordance with the present invention, there is no risk at all that the substrate 2 is corroded by the gas G, as occurs with conventional silicon made substrate, because the gas to be measured passes through sensor S while contacting with SUS316L made substrate 2.

Embodiment 2

FIG. 15 shows the case where the sensor S for fluid, according to the present invention, is fitted to the main body part of the pressure type flow rate controller. As shown in FIG. 15, S designates a fluid sensor, 31 designates a body, 32 designates a pressure detector, 33 designates a control valve, 34 designates a Piezo-electric valve driving device, 35 designates an orifice and 36 designates a filter.

Embodiment 3

FIG. 16 shows an alternate fitting position of the sensor S for fluid according to the present invention. However, it is substantially the same as that in FIG. 15. Since the structure of a pressure type flow rate controller and its main parts have been disclosed by, for example, Japanese Patent No. 3291161, the TOKU-KAI-HEI No. 11-345027 and others, explanation of this structure is omitted here. The method of fitting a sensor S for fluid is the same in the embodiment of FIG. 16 as that in FIG. 14. Therefore, the above explanation is not repeated.

Embodiment 4

FIG. 17 to FIG. 19 show another example in which a sensor S for fluid, according to the present invention, is fitted to a structural component, which constitutes a fluid controller. FIG. 17 is a plan view, FIG. 18 is a cross-sectional view, and FIG. 19 is a side view. As shown by FIG. 17 to FIG. 19, 37 designates a relay substrate, 38 designates a bearing, 39 designated a fixture screw hole for the sensor S, 51 designates a fluid flow-in inlet, and 52 designates a fluid flow-out outlet. The method of fitting a sensor S for fluid is the same as those described in FIG. 14 and FIG. 16. Therefore, an explanation of the fitting method described above is not repeated here.

FEASIBILITY OF INDUSTRIAL USE

The present invention is mainly used for detecting mass flow rate and/or pressure in gas supply lines of semiconductor manufacturing facilities, various kinds of chemical product manufacturing equipment, and the like. However, the present invention can be also utilized for detecting mass flow rate and pressure of a gas in the gas supply lines in many industrial fields.

The invention claimed is:

1. A corrosion-resistant metal made sensor for measuring mass flow rate and pressure of fluid, comprising:
   (a) a mass flow rate sensor part operable to measure mass flow rate of fluid and to provide a first output corresponding to the measured mass flow rate, the mass flow rate sensor part comprising
      i. a corrosion-resistant metal substrate; and
      ii. a thin film forming a temperature sensor and a heater installed on a back face side of a fluid contacting surface of the corrosion-resistant substrate; and
   (b) a pressure sensor part operable to measure pressure of fluid and to provide a second output corresponding to the measured pressure, the pressure sensor part comprising a thin film forming a strain sensor element installed on the back face side of the fluid contacting surface of the corrosion-resistant metal substrate, wherein output drift of the mass flow rate sensor part, due to pressure changes of the fluid measured by the mass flow rate sensor part, is corrected by the second output of the pressure sensor part.

2. A corrosion-resistant metal made sensor as claimed in claim 1, wherein the corrosion-resistant metal substrate is fitted into a mounting groove of a corrosion-resistant metal made sensor base so that the fluid contacting surface is exposed outwardly, and a peripheral edge of the corrosion-resistant metal substrate is hermetically welded to the sensor base.

3. A corrosion-resistant metal made sensor as claimed in claim 1, wherein the thin film includes an insulation film formed on the back side of the fluid contacting surface of the corrosion-resistant metal substrate, a metal film that forms the temperature sensor, the heater and a strain sensor element, and a protection film covering the insulating film and the metal film.

4. A fluid supply device that employs the corrosion-resistant metal made sensor according to claim 1 mounted on a fluid controller in order that flow rate and pressure of fluid is appropriately checked at a time of fluid control.

5. A fluid supply device that employs the corrosion-resistant metal made sensor according to claim 2, wherein the sensor base is positioned inside a fluid passage of a body equipped with the fluid passage that communicates between a flow-in inlet for fluid and a flow-out outlet for the fluid by installing a metal gasket in order that hermeticity between the body and the sensor base is held by thrust by the metal gasket through mediation of the sensor base, and at the same time stiffness of a structural component disposed directly above the metal gasket relatively raises hermeticity between the body and the sensor base, thus suppressing strain of the mass flow rate sensor part and the pressure sensor part caused by thrust by the metal gasket.

6. A corrosion-resistant metal made sensor as claimed in claim 2, wherein the thin film includes an insulation film formed on the back side of the fluid contacting surface of the corrosion-resistant metal substrate, a metal film that forms the temperature sensor, the heater and a strain sensor element, and a protection film covering the insulating film and the metal film.

7. A fluid supply device that employs the corrosion-resistant metal made sensor according to claim 2 mounted on a fluid controller in order that flow rate and pressure of fluid is appropriately checked at a time of fluid control.

8. A fluid supply device that employs the corrosion-resistant metal made sensor according to claim 1 mounted on a fluid controller in order that flow rate and pressure of fluid is appropriately checked at a time of fluid control.

9. A fluid supply device that employs the corrosion-resistant metal made sensor according to claim 3 mounted on a fluid controller in order that flow rate and pressure of fluid is appropriately checked at a time of fluid control.

10. A corrosion-resistant metal made sensor as claimed in claim 1, wherein the mass flow rate sensor part is disposed to provide the first output corresponding to the measured mass flow rate to a first differential amplifying circuit, and the pressure sensor part is disposed to provide the second output corresponding to the measured pressure to a second differential amplifying circuit.

11. A corrosion-resistant metal made sensor as claimed in claim 10, wherein the first differential amplifying circuit is disposed to output a third output to an offset adjustment circuit, and the second differential amplifying circuit is disposed to output a fourth output to a signal treatment circuit, and the signal treatment circuit is disposed to output a fifth output to the offset adjustment circuit so that the output drift of the mass flow rate sensor part, due to pressure changes of the fluid measured by the mass flow rate sensor part, is corrected by the second output of the pressure sensor part.

* * * * *